No. 788,715. PATENTED MAY 2, 1905.
M. GREENFIELD.
SHOP OR OTHER COUNTER OR DESK.
APPLICATION FILED JULY 11, 1902.
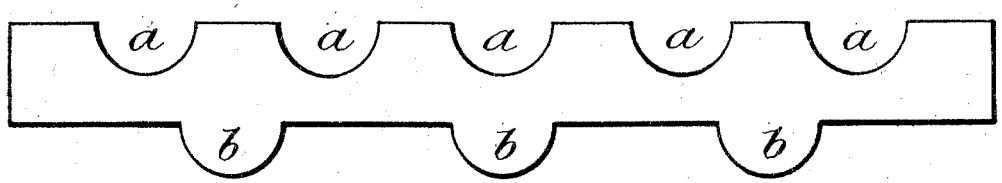
Witnesses.
J. J. Rowley
F. M. Mellor
Inventor
Maurice Greenfield
per J. B. Fleuret
attorney.

No. 788,715. Patented May 2, 1905.

UNITED STATES PATENT OFFICE.

MAURICE GREENFIELD, OF WANDSWORTH, ENGLAND.

SHOP OR OTHER COUNTER OR DESK.

SPECIFICATION forming part of Letters Patent No. 788,715, dated May 2, 1905.

Application filed July 11, 1902. Serial No. 115,181.

*To all whom it may concern:*

Be it known that I, MAURICE GREENFIELD, stockkeeper, a subject of the King of Great Britain and Ireland, residing at 26 Burr road, Southfields, Wandsworth, S. W., in the county of London, England, have invented certain new and useful Improvements in Shop or other Counters or Desks, of which the following is a specification.

The object of this invention is to provide means for facilitating the sale of goods to customers by shop assistants and the like.

According to this invention the counter, desk, or the like used for the sale of goods or for other business is formed in front with recesses or with projecting portions at suitable distances apart, in which recesses or between which projecting portions the customers sit or stand when giving their orders and receiving their goods. By this means the customers are out of the path of other customers or shop assistants passing along in front of the counter, and consequently are not liable to be subjected to pushing or jostling from the same. Projections or recesses are also formed opposite the recesses or projecting portions on the other or inner side of the counter, in which recesses or between which projecting portions the assistants or countermen stand when serving the customers, thus also keeping them free from or out of the path of their fellow assistants or others who may be passing along the passage or space behind the counter.

In order to clearly understand my invention, reference is had to the accompanying drawing, representing a plan or diagram of my improved counter.

$a$ represents the recesses in front of the counter, and $b$ represents the projecting portions at the back, between which the assistants stand when serving the customers, who stand or sit in the recesses $a$. The said recesses $a$ and projections $b$ may be semicircular, square, or other suitable shape and may be placed in line with or alternately of each other. The tops of the counters only may be formed with the said recesses and projections and the bodies be left plain, or the bodies as well as the tops may be formed with the same flush with the tops and suitably ornamented. In some the fronts only of the counters may be formed with the recesses or projections, the backs being left plain, or vice versa, the backs being formed with the same while the fronts are plain.

Having now fully described the nature of my said invention, what I claim, and desire to secure by Letters Patent, is—

A counter or desk provided with recesses at one side thereof and projections at the opposite side thereof, substantially as described.

In witness whereof I have hereunto set my hand in the presence of two witnesses.

MAURICE GREENFIELD.

Witnesses:
JOHN BEACH FLEURET,
FREDERICK MICAH MELLOR.